UNITED STATES PATENT OFFICE.

CHARLES MENSMAN, OF ST. LOUIS, MISSOURI, ASSIGNOR OF TWO-THIRDS HIS RIGHT TO ALEXANDER D. GARDEN AND JOSEPH W. KELLER, OF SAME PLACE.

IMPROVEMENT IN MEAT-EXTRACTS.

Specification forming part of Letters Patent No. 177,534, dated May 16, 1876; application filed December 29, 1875.

*To whom it may concern:*

Be it known that I, CHARLES MENSMAN, of the city and county of St. Louis, and State of Missouri, have invented a new and useful Improvement in Tonic Preparation of Beef, which improvement is fully set forth in the following specification:

My improvement consists of a compound of beef-extract with Cologne spirits, &c.

In the preparation of my tonic, I place in a kettle four beef-brains and one hundred pounds of lean beef, cut into small pieces, and cover it with water. Then, cover the kettle well, and boil for eight hours, or until the contents of the kettle are reduced to seventy-five pounds in weight. I then remove the beef, and filter the remaining liquor or extract. I then add to the extract forty-five per cent. of Cologne spirits, and mix well together. I then have a kettle of hot water, which is kept at a temperature of 100°. I place therein a smaller kettle containing warm beef-blood, about one quart, fresh from the beef. I then add one-eighth ounce of pepsin to the blood, and in three hours the blood will be dissolved so as not to coagulate when it cools. I then add thirty per cent. of Cologne spirits, and mix well together. I then put the preparation of the blood, as mixed, into the extract of beef, and mix well, which completes the above preparation.

The blood as prepared will keep indefinitely, and is a good remedy in the first stage of consumption.

The beef-tonic as made will cure dyspepsia, debility, nervous headaches, diarrhea, and monthly irregularities of females.

I claim as my invention—

1. The process for preparing a concentrated meat-extract by the boiling of flesh and brains and the subsequent addition of spirits.

2. The tonic preparation of meat, consisting of a concentrated extract of flesh and brains with prepared blood and spirits, substantially as described.

CHARLES MENSMAN.

Witnesses:
SAML. KNIGHT,
ROBERT BURNS.